United States Patent Office 3,211,568
Patented Oct. 12, 1965

3,211,568
MAGNESIAS MODIFIED WITH ORGANIC SULPHUR COMPOUNDS
Richard A. Patton, Arlington Heights, Ill., assignor to Morton Salt Company, Chicago, Ill., a corporation of Delaware
No Drawing. Filed Apr. 10, 1962, Ser. No. 186,368
11 Claims. (Cl. 106—308)

This invention relates to novel magnesium oxide compositions and more specifically to organically modified magnesias, and to methods of producing the same.

The products of the present invention have utility as reinforcing fillers in a variety of organic polymeric and elastomeric materials. They are more compatible with organic materials than the unmodified magnesia and therefore lend themselves to ease of incorporation into organics. In some instances, certain organic sulfur compounds used in the modification of magnesias result in a product which has a dual function in elastomer processing, namely as a filler and as an accelerator or curing aid. This latter class of organically modified magnesias has properties which produce results that differ substantially from those obtained by the use of the components per se.

Magnesium oxide, or more conventionally magnesia, is a well known commodity of commerce. Magnesia may be prepared from a number of natural minerals. Magnesite (magnesium carbonate) may be calcined directly to magnesia. When this is done, a high density magnesium oxide of coarse particle size results. Brucite, naturally occurring magnesium hydroxide, may also be calcined directly to magnesium oxide. Once again high density, coarse particle magnesium oxide results. Dolomite, because of the presence of calcium oxide, requires treatment to separate the alkaline oxides after calcining. This may be done by treatment of the quicklime with carbon dioxide to solubilize the magnesium component as the bicarbonate. Filtration and washing will then produce a liquor which may, by heat, be decomposed to a basic carbonate. The basic carbonate may then be calcined to magnesium oxide. This is the process that has been employed to produce insulating magnesia.

The production of magnesium oxide made from sea water or brine involves the lime treatment of the magnesium ion containing solution. For example, the calcium oxide component of the calcined dolomite (dolomitic lime) will react with soluble magnesium chloride to produce insoluble magnesium hydroxide and soluble calcium chloride. While it is possible to produce a high surface area magnesia from naturally occurring materials, the highest surface areas and the most reactive magnesia are produced by calcination of precipitated fine particle materials of magnesium carbonate or magnesium hydroxide. For purposes of this invention any active magnesia, regardless of origin, is a suitable starting material. It is preferred, however, to employ the finer particle size precipitated materials.

If the calcination step is carried out at more moderate temperatures, the product produced is less crystalline and more amorphous in character than periclase. This magnesia may be used in a variety of industrial applications, such as a curing aid for elastomers, the manufacture of cements, metal coatings and other well known uses. The product may be characterized as a lightly calcined magnesia.

It has been found that many of the lightly calcined magnesias of commerce have unusual properties which are not common to the hard calcined periclase or the starting materials from which magnesias are prepared, namely the hydroxide or the carbonate. One characteristic of these lightly calcined magnesias is the ability to adsorb iodine. It has been found that magnesias having an iodine adsorption value of from 10 to about 300 milligrams per gram are capable of reacting with certain broad classes of organic compounds to produce an organically modified magnesia. The reactivity of these magnesias is highly unexpected in view of the fact that the starting materials, such as magnesium hydroxide, are unreactive with respect to these organic compounds. Magnesias having an iodine number below 10, such as periclase, are also unreactive.

Inasmuch as magnesia as such is often used in conjunction with organic or hydrocarbon derived materials, it would be desirable, if a product could be produced which would modify the purely inorganic characteristics of magnesia, to produce a material which is more compatible with organic compositions.

Accordingly, in one broad form, the compositions of the present invention are prepared by a process comprising contacting a lightly calcined magnesium oxide or magnesia having an iodine adsorption number of from about 10 to 300 with an organic sulfur compound containing up to 20 carbon atoms.

The magnesia starting material is a commercially available product which is sold under a variety of trade names. Magnesium carbonate derived magnesias are sold by the Morton Chemical Company as the 57 series A through G. The magnesium hydroxide derived magnesias are sold under the trade name Elastomag.

As indicated in the foregoing, the magnesia starting materials of the present invention have an iodine adsorption number or value of from about 10 to about 300 milligrams of iodine per gram of dry magnesium oxide, and in the most preferred instance have an iodine number of from about 15 to about 220. The iodine number as referred to herein is determined by the following procedure:

METHOD OF IODINE NUMBER DETERMINATION (1) Weigh a 2 gram sample of magnesium oxide to the nearest milligram.

(2) Transfer to a clear, dry, 200 ml. glass-stoppered bottle.

(3) Add 100±0.2 ml. of 0.100 N iodine in carbon tetrachloride, free from traces of sulfur or carbon disulfide.

(4) Stopper the bottle and shake vigorously at ambient temperature in a suitable shaking device for 30 minutes (the test is relatively insensitive to temperature so that no temperature controls are employed).

(5) Allow to settle for 5 minutes and then pipette a 20 ml. aliquot of the clear solution into a 250 ml. Erlenmeyer flask containing 50 ml. of 0.03 N potassium iodide in 75 percent ethanol.

(6) Titrate the 20 ml. aliquot with standard 0.05 N sodium thiosulfate. The sodium thiosulfate should be standardized at least once every two weeks against a standard potassium iodate solution. A sharp end point is obtained without the use of starch indicator.

(7) Calculate iodine number in terms of milligrams of iodine per gram of sample according to the following equation:

$$(V_2-V_1)\frac{127 \times N_1}{0.4} = \text{mg. 1/g.} = \text{iodine number}$$

where $V_2$ is the volume of thiosulfate equivalent to 20 ml. of the original iodine solution—before adsorption of iodine by the oxide; where $V_1$ is the volume of thiosulfate required by the 20 ml. aliquot after the adsorption; and $N_1$ is the normality of the thiosulfate solution.

Broadly the class of organic sulfur compounds, useful in the process of the present invention, includes mercaptans, such as alkyl, alkenyl, cycloalkyl, aryl aralkyl, and heterocyclic mercaptans; sulfides, such as monosulfides, disulfides, tetrasulfides, polysulfides and the like; substituted thioureas, sulfonamides, and carbon disulfide. Exemplary of alkyl, cycloalkyl, alkenyl, aralkyl and aryl mercaptans are propyl mercaptan, 2-ethylhexyl mercaptan, 2-hydroxyethyl mercaptan, 3-hydroxy-1,2-dimercaptopropane, dodecyl mercaptan, cyclohexyl mercaptan, thiophenyl (phenyl mercaptan), benzyl mercaptan, hexenyl mercaptan, and phenethyl mercaptan. Exemplary of heterocyclic mercaptans are 2-mercaptoimidazoline, 2-thiazolidinethione and thiohydropyrimidine. Exemplary of sulfides are tetramethylthiuram sulfide, dipentamethylene thiuram tetrasulfide, tetramethylthiuram disulfide, thiophene and the like. Thioureas include alkyl substituted thioureas, such as trimethyl thiourea.

From the foregoing it may be understood that the organic sulfur compounds may be in a variety of forms and have a variety of substituents which may be the same or different.

The products of the present invention may be prepared as indicated above by contacting a lightly calcined magnesia, as above defined, with the organic sulfur compound of the broad class previously described. Generally the reaction takes place at temperatures from about 0° C. to about 225° C., but is preferably carried out at temperatures of from about 65° C. to about 170° C. If desired, the process may be carried out in a liquid phase and in conjunction with an inert solvent, such as benzene, toluene, heptane, octane, xylene, carbon tetrachloride, or the like. The less polar solvents are preferred. In some instances an excess of organic sulfur compound reactant may be used as a fluid medium. Refluxing is one convenient method of carrying out the reaction.

The ratio of reactants will, of course, vary, but generally it is preferred to use an excess of organic sulfur compound in the reaction, and a molar excess of at least 10% over the amount of sulfur compound sought to be introduced, is preferred. Of course, it should be understood that larger amounts of organic sulfur compound may be used in the process of this invention, and the excess unreacted starting material recovered after the reaction is complete.

The reaction time is not critical, and periods of time ranging from about ½ hour to 80 hours may be employed, depending on the mode of reaction. Ordinarily the reaction proceeds at a higher rate at the more elevated temperatures. The extent of reaction, that is, the amount of organic sulfur compound that may be introduced, varies with the iodine number of the magnesia, the character of the sulfur compounds both as to reactivity and molecular weight, and the physical state of the magnesium oxide (particle size). Generally it has been found that passing the reaction mixture through a colloid mill or homogenizer results in appreciably more reaction and consequently a greater percentage of organic material in the magnesia product. The "wet batch" procedure (reflux or heating in an organic fluid [solvent] medium) usually results in complete reaction in from about ½ to 3 hours.

In some instances water is evolved in the reaction process, and the degree of reaction between the inorganic magnesia substrate and the organic sulfur compound determined or monitored by observing the water recovered from the reaction mixture. This may be conveniently measured by using inert solvents which azeotrope with water, and recovering the water in a Dean-Stark trap. In some instances the extent of reaction is considerably greater than the water recovered would indicate.

When the reaction is complete, as may be determined in some instances by the cessation of the evolution of water, the reaction product is recovered by filtration and washed with a volatile inert solvent to remove any excess organic reactant. Solvents for washing may be any inert material substantially of the same type as are used for the reaction medium. After washing, the filter cake is dried, preferably at temperatures of from between about 65 and 100° C., and pulverized into a powder.

The products of the present invention may also be prepared by means of a fluidized bed technique wherein a pulverized lightly calcined magnesium oxide reactant is placed in a fluid bed apparatus and a vaporized organic sulfur reactant carried into and through the fluidized bed by the fluidizing gas stream. Excess organic vapors may be stripped from the fluidized magnesium oxide in the same apparatus, if desired. In utilizing fluid bed techniques the magnesium oxide does not need to be separated from solvent, washed or dried, as in the case of the "wet batch" technique. Generally the same temperatures are useful in fluidized bed technique as in the solvent system or "wet batch" technique using a liquid reaction medium. The temperature employed will usually depend upon the boiling point of the organic sulfur reactant or its partial pressure in the fluidizing gas system. While the over-all time of the reaction in fluid bed operations carried out at these temperatures is from about ½ to 80 hours, a preferred time is from 10 to 60 hours. The following specific examples will further illustrate the process for producing the compositions of the present invention.

EXAMPLE 1

Into a 3-liter 3-necked flask, equipped with a thermometer, stirrer and reflux condenser with attached Dean-Stark trap, were placed 1.5 liters of dry benzene and 24.5 grams of 1-dodecanethiol. The contents of the flask were heated and agitated until solution was complete. To the resulting solution was added 230 grams of dry, lightly calcined magnesium oxide having an iodine adsorption value or activity of 170. The contents of the flask were heated to reflux, and stirred. Water of reaction (3.5 grams total) was collected and measured in the Dean-Stark trap during the reaction period. The reaction was considered complete when water was no longer evolved from the reaction mixture (2 hours). The product was recovered by vacuum filtration with a Buchner funnel. The filter cake was washed with hot benzene and allowed to air dry followed by drying under vacuum at 65° C. for a period of from 8 to 10 hours. A blank was run by refluxing magnesium oxide in benzene, which resulted in recovery of 2.1 grams of water, which when subtracted from 3.5 grams recovered in the reaction, gave a net water of reaction of 1.4 grams. The product had an organic content of 2.54%. The final product after drying had a weight of 236.6 grams.

EXAMPLE 2

*Reaction product of magnesium oxide and 2-mercaptoimidazoline*

The magnesium oxide (magnesia) used was derived from magnesium hydroxide by calcination and had an iodine adsorption number of 100.

Into a 3-liter, 3-necked flask equipped with thermometer, stirrer, and reflux condenser and attached Dean-Stark trap, were placed 230 grams benzene and 28.8 grams of 2-mercaptoimidazoline (NA–22; E. I. du Pont de Nemours & Company). The reaction vessel was heated by means of a mantle to maintain reflux (78° C.). Water present was azeotropically distilled and collected in the Dean-Stark trap. The contents of the vessel were cooled to 60–65° C., and 230 grams of the magnesia added with stirring. The reaction mixture was then heated to reflux with stirring. The water of reaction (1.45 grams) was collected in the Dean-Stark trap over a one hour period. The contents of the flask were then filtered on a Buchner funnel, and the filter cake washed with 200 ml. of hot benzene. The filter cake was then air dried for about two hours and then dried under vacuum at 65° C. for about ten hours to remove traces of benzene. Similar adducts were prepared from hydroxide derived magnesias of iodine numbers 20 and 170.

The following table will illustrate the production of organically modified magnesias using organic sulfur compounds by the method described above.

| Ex. | Magnesium Oxide | | Organic Amino Compound | | Water Evolved, Grams | | | Reaction Conditions | | | Weight Percent Organic in Product |
|---|---|---|---|---|---|---|---|---|---|---|---|
| | Amount, Grams | Iodine No. | Type | Amount, Grams | Total | Blank | Net | Time (Hrs.) | Temp. (°C.) | Solvent | |
| 3 | 230 | 100 | t-Dodecylmercaptan | 29 | 3.3 | 2.1 | 1.2 | 2 | 80 | Benzene | 2.5 |
| 4 | 230 | 170 | 2-hydroxyethanethiol | 15.6 | 6.0 | 3.0 | 3.0 | 3 | 117 | Toluene | 4.6 |
| 5 | 230 | 170 | Thiate A [1] | 16 | 2.5 | 1.6 | 0.9 | 3 | 140 | Xylene | 5.2 |
| 6 | 230 | 100 | ----do.[2] | 11.8 | 1.6 | 1.3 | 0.3 | 3 | 117 | Toluene | 5.4 |
| 7 | 230 | 100 | MBTS [3] | 30 | 2.8 | 2.0 | 0.8 | 3 | 117 | ----do | 7.7 |
| 8 | 230 | 170 | Tetrone A [4] | 38.4 | 2.4 | 2.1 | 0.3 | 3 | 117 | ----do | 4.1 |
| 9 | 230 | 170 | Thionex [5] | 41.6 | 6.5 | 2.8 | 3.7 | 3 | 117 | ----do | 3.5 |
| 10 | 230 | 170 | Thiuram E [6] | 59.2 | 3.7 | 2.9 | 0.8 | 3 | 117 | ----do | 5.2 |
| 11 | 230 | 170 | Thiuram M [7] | 24.0 | 6.6 | 3.2 | 3.4 | 3 | 117 | ----do | 3.1 |
| 12 | 230 | 170 | ----do | 48.0 | 6.0 | 3.2 | 2.8 | 3 | 117 | ----do | 4.3 |
| 13 | 230 | 170 | Thiophene | 42.0 | 2.7 | 2.7 | 0 | 3 | 117 | ----do | 1.2 |
| 14 | 230 | 170 | 2-thiazolidinethione | 23.8 | 2.4 | 2.3 | 0.1 | 3 | 117 | ----do | 5.0 |
| 15 | 230 | 100 | Santocure NS [8] | 30 | 4.7 | 2.0 | 2.7 | 3 | 140 | Xylene | 7.2 |
| 16 | 230 | 100 | Santocure [9] | 30 | 3.2 | 2.0 | 1.2 | 3 | 140 | ----do | 7.2 |
| 17 | 230 | 170 | Mercaptoimidazoline [10] | 10.2 | 4.2 | 3.0 | 1.2 | 3 | 117 | Toluene | 2.2 |
| 18 | 230 | 170 | ----do | 20.4 | 4.3 | 3.0 | 1.3 | 3 | 117 | ----do | 2.2 |
| 19 | 230 | 100 | ----do.[11] [12] | 120.0 | 7.7 | 2.0 | 5.7 | 3 | 117 | Benzene | 34.0 |
| 20 | 230 | 170 | Mercaptobenzothiazole [13] | 33.4 | 3.6 | 3.3 | 0.3 | 3 | 117 | Toluene | 8.4 |
| 21 | 230 | 170 | Thiophenol | 11.0 | 2.4 | 1.6 | 0.8 | 3 | 117 | ----do | 2.9 |
| 22 | 230 | 170 | Thiate B | 13.6 | 3.0 | 3.0 | 0 | 3 | 117 | ----do | 2.4 |

[1] Thiate A: thiohydropyrimidine.
[2] Thiate E: trimethylthiourea.
[3] MBTS: mercaptobenzothiazole disulfide.
[4] Tetrone A: dipentamethylenethiuram disulfide.
[5] Thionex: tetramethylthiuram monosulfide.
[6] Thiuram E: tetraethylthiuram disulfide.
[7] Thiuram M: tetramethylthiuram disulfide.
[8] Santocure NS: (N-t-butyl)-2-benzothiazyl sulfonamide.
[9] Santocure: N-cyclohexyl-2-benzothiazyl sulfonamide.
[10] NA 22.
[11] Reaction product homogenized.
[12] Homogenized.
[13] MBT.

The organically modified magnesias of this invention may be further characterized as containing from 1 to 35 percent organic material, and preferably from about 2.5 to 15 percent organic material. The organic modification of the purely inorganic character of magnesia results in a composition that is more compatible with hydrocarbon derived materials, and particularly suitable as a filler, reinforcing agent, accelerator or vulcanizing aid for elastomers, polymers or the like, or as an organic-inorganic-compatible additive for fuel oils, lubricants, etc.

While the foregoing examples illustrate the production of various specific organic sulfur modified magnesium oxides, it will be understood that other organic sulfur compounds may also be used in such organic modification.

For example, a standard neoprene stock was compounded with a magnesia of iodine number 100 that had been pre-reacted with N-ethyl-N',N'-dimethylthiourea (an accelerator sold by R. T. Vanderbilt Co., under the trade name "Thiate B"). For purposes of comparison a mechanical mixture of these materials was compounded in the same stock. The following formulation was used:

Neoprene stock:

| | Parts |
|---|---|
| Neoprene W | 100 |
| Zinc oxide | 5.0 |
| Stearic acid | 0.5 |
| Stabilizer ("Agerite Stalite S") [1] | 2.0 |
| Plasticizer (Circolight oil) | 5.0 |
| Thermal carbon black (Thermax) [1] | 75.0 |
| Accelerator-magnesia (see Table II) | 9.3 |

[1] R. T. Vanderbilt Co.

TABLE II

Formulation A: Accelerator-magnesia is mechanical mixture of 8.55 parts magnesia (iodine No. 100) and 0.75 part Thiate B, Formulation B: Accelerator was reaction product of magnesia and Thiate B in proportions of Formulation A—Total 9.3 parts.

The increased process safety in the use of pre-reacted material may be observed in a comparison of the Mooney scorch time for the two neoprene stock formulations. The Mooney scorch tests were run at 250° F.

| | Mooney Scorch time (Minutes) | |
|---|---|---|
| | 5 point rise | 10 point rise |
| Formulation A | 27 | 34 |
| Formulation B | 44 | 60 |

Similar advantages are found in other compositions formed by reaction of rubber accelerators with magnesium oxide in accordance with the process of this invention.

As a further example, an adduct of 0.63 part ethylene thiourea [2-mercaptoimidazoline] and 5 parts of magnesia (iodine adsorption number of 20) prepared by the procedure of Example 2 was incorporated into a chlorobutyl rubber vulcanizing stock formulation C. A control formulation D was prepared using a mechanical mixture of the components in the adduct in the same proportions.

| Formulation | C (Parts) | D (Parts) |
|---|---|---|
| Chlorobutyl rubber (Enjay MD-551) | 100.0 | 100.0 |
| Antioxidant "2246" [1] | 1.0 | 1.0 |
| Carbon black (furnace black) | 50.0 | 50.0 |
| Magnesium oxide | | 5.0 |
| Ethylene thiourea | | 0.63 |
| Adduct [2] | 5.63 | |

[1] American Cyanamide 2,2'-methylene-bis(4-methyl-6-t-butyl phenol).
[2] 0.63 part ethylene thiourea and 5.0 parts magnesium oxide.

The rubber stocks identified as C and D above were cured for 60 minutes at 320° F. They had the following physical properties:

| | C | D |
|---|---|---|
| Tensile strength (p.s.i.) | 2,050 | 1,740 |
| Elongation | 293 | 247 |
| Tensile product [1] | 6.0 | 4.3 |

[1] Product of tensile strength and elongation × 10⁻⁵.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

I claim:

1. A process for preparing an organically modified magnesia which comprises admixing in a solvent medium at a temperature above about 0° C. a lightly calcined magnesia having an iodine absorption number of from about 10 to 300 with an organic sulfur compound containing up to 20 carbon atoms, said organic sulfur compound being selected from the group consisting of alkyl, alkenyl, cycloalkyl, aryl, aralkyl and heterocyclic mercaptans, sulfides, substituted thioureas, sulfonamides, and carbon disulfide and recovering the resulting reaction product.

2. A product of the process of claim 1 containing from 1 to 35% organic matter derived from said organic sulfur compound.

3. The process of claim 1 wherein the contacting is carried out under substantially anhydrous conditions.

4. The process of claim 1 wherein the magnesia has an iodine adsorption number of from 15 to 220.

5. The process of claim 1 wherein the contacting is carried out at a temperature between about 0° C. and 225° C.

6. The process of claim 1 wherein the organic sulfur compound is trimethylthiourea.

7. The process of claim 1 wherein the organic sulfur compound is 2-mercaptoimidazoline.

8. The process of claim 1 wherein the organic sulfur compound is mercaptobenzothiazole disulfide.

9. The process of claim 1 wherein the organic sulfur compound is tetramethylthiuram disulfide.

10. The process of claim 1 wherein the organic sulfur compound is N-cyclohexyl-2-benzothiazyl sulfonamide.

11. A process for preparing an organically modified magnesia which comprises admixing in a fluidized bed at a temperature above about 0° C. a lightly calcined magnesia having an iodine absorption number of from about 10 to 300 with an organic sulfur compound containing up to 20 carbon atoms, said organic sulfur compound being selected from the group consisting of alkyl, alkenyl, cycloalkyl, aryl, aralkyl, and heterocyclic mercaptans, sulfides, substituted thioureas, sulfonamides, and carbon disulfide, and recovering the resulting reaction product.

References Cited by the Examiner
UNITED STATES PATENTS

| | | | |
|---|---|---|---|
| 2,739,075 | 3/56 | Iler | 106—308 |
| 2,973,282 | 2/61 | Gross | 106—288 |

TOBIAS E. LEVOW, *Primary Examiner.*

UNITED STATES PATENT OFFICE
CERTIFICATE OF CORRECTION

Patent No. 3,211,568                           October 12, 1965

Richard A. Patton

It is hereby certified that error appears in the above numbered patent requiring correction and that the said Letters Patent should read as corrected below.

Columns 5 and 6, before the table insert "TABLE I --; same columns 5 and 6, same table, last column, opposite Ex. 18, for "2.2" read -- 5.7 --; column 5, line 52, for " ʹ"Agerite Stalite S")$^{1}$" read -- ("Agerite Stalite S")$^{1}$ --.

Signed and sealed this 7th day of June 1966.

(SEAL)
Attest:

ERNEST W. SWIDER                                   EDWARD J. BRENNER
Attesting Officer                                          Commissioner of Patents